United States Patent [19]

Otsuki

[11] Patent Number: 5,347,207
[45] Date of Patent: Sep. 13, 1994

[54] DISC SHAPED RECORDING MEDIUM HAVING A ZERO TRACK ADDRESS AND MULTIBIT OPPOSITE POLARITY TRACK ADDRESSES AND AN ADDRESS DISCRIMINATION CIRCUIT FOR READING SUCH RECORDING MEDIUM

[75] Inventor: Tadashi Otsuki, Kanagawa, Japan

[73] Assignee: Sony Corporation, Japan

[21] Appl. No.: 9,897

[22] Filed: Jan. 27, 1993

[30] Foreign Application Priority Data

Jan. 28, 1992 [JP] Japan ................................. 4-035743

[51] Int. Cl.$^5$ .................... G11B 17/22; G11B 5/02; G11B 3/70; G11B 5/84
[52] U.S. Cl. ..................................... 369/33; 360/59; 369/275.3
[58] Field of Search ................. 369/59, 32, 44.25, 47, 369/48, 50, 275.3, 275.4, 33; 360/48, 49, 59

[56] References Cited

U.S. PATENT DOCUMENTS

| | | | |
|---|---|---|---|
| 4,523,304 | 6/1985 | Satoh et al. | 369/32 |
| 4,630,252 | 12/1986 | Miura et al. | 369/32 X |
| 4,677,603 | 6/1987 | Kenjyo | 369/32 |
| 4,736,352 | 4/1988 | Saxon et al. | 369/32 |
| 4,847,708 | 7/1989 | Furuyama | 369/32 |
| 5,151,891 | 9/1992 | Bergmans | 369/59 |

Primary Examiner—John Shepperd
Assistant Examiner—Patrick Wamsley
Attorney, Agent, or Firm—Limbach & Limbach

[57] ABSTRACT

A recording medium in the form of a disc in which locations on said disc other than a predetermined location set as a zero-address are represented by (+) side addresses and (−) side addresses with respect to the zero address, and in which the information concerning these addresses are at least recorded as address data constituted by N bits. With the disc-shaped recording medium the fact that the number of addresses necessary for the radially inner region of the disc is smaller than the number of addresses necessary for the radially outer region of the disc is utilized in such a manner that the upper four bits of 16 bits are used in the manner of sign bits for representing the addresses on the radially inner side of the disc, with the remaining bits being used for representing the addresses, with the 16 bits inclusive of the upper four bits being used for representing the addresses for the radially outer region of the disc. In this manner, the totality of the tracks may be represented while maintaining interchangeability with the conventional discs even although the track pitch is smaller than in the case of conventional discs. Besides, the address discrimination may also be facilitated.

5 Claims, 5 Drawing Sheets

DISC SHAPED RECORDING MEDIUM HAVING A ZERO TRACK ADDRESS AND MULTIBIT OPPOSITE POLARITY TRACK ADDRESSES AND AN ADDRESS DISCRIMINATION CIRCUIT FOR READING SUCH RECORDING MEDIUM

BACKGROUND OF THE INVENTION

This invention relates to a disc-shaped recording medium, such as an optical disc, and an address data discriminating circuit for discriminating addresses, such as track addresses, on the disc-shaped recording medium.

Such a disc-shaped recording medium includes an optical disc and a magneto-optical disc. An example of the disc-shaped recording medium is a magneto-optical disc having a format as proposed in ISO/IEC 10089:1991(E).

On the above optical disc, there are formed concentric tracks, or there is formed a spiral track. With the optical disc of the above format, a track at a radial distance of 30 mm from the disc center bears a zero track address, and tracks at a radially outer side of the zero track address or within a range of from 30 mm to 60 mm in terms of a disc radius are indicated by (+) side track addresses, while those at a radially inner side of the zero track address are indicated by (−) side track addresses. The radially outer side region of the disc, having the plus (+) side tracks, is a user area, while the tracks on the radially inner side of the zero track address at the radius of 30 mm are used as test tracks or control data tracks. The above-mentioned track addresses are recorded by embossed bits on the optical disc by 2 bytes or 16 bits.

With the disc format listed above, the current track pitch is 1.6 μm. It has recently been envisaged to narrow the track pitch for increasing the disc capacity. For example, it is contemplated to use a track pitch of 4.4 μm.

However, if the track pitch of, for example, 1.4 μm is used in place of the currently employed track pitch of 1.6 μm the number of tracks and that of sectors is increased progressively towards the outer periphery of the disc if the disc is to be rotated with modified constant angular velocity (MCAV), such that, if the above-mentioned format is to be maintained, it becomes impossible to represent all of the tracks at the radially outer side or (+) side of the disc. Meanwhile, the radially inner side or (−) side tracks need to be formatted at least to a radius of 29.52 mm. This can be done without any inconvenience because there are about 300 tracks in this region for the track pitch of 1.6 μm.

With the above format, tracks of the (+) side up to the +32767th track and tracks of the (−) side up to the −32768th track are represented by 2's complement representation of 2 bytes or 16 bits, so that for a track pitch of 1.6 μm the totality, of the tracks can be represented by the 2's complement representation of the 16 bits. However, if the track pitch of 1.4 μm is used, there is a possibility that the number of tracks on one side of the zero address track exceed 32768, such that it becomes impossible to indicate the totality of tracks by 2's complement representation of 16 bits.

OBJECT AND SUMMARY OF THE INVENTION

In view of the above-described status of the art, it is an object of the present invention to provide a disc-shaped recording medium and an address discriminating circuit therefor in which, even when the track pitch is reduced in comparison with the conventional system, the tracks can be indicated in their entirety while maintaining interchangeability with the conventional system.

In accordance with the present invention, there is provided a recording medium in the form of a disc in which locations on the disc other than a predetermined location as set as zero-address are represented by (+) side addresses and (−) side addresses with respect to the zero address, and in which the information concerning these addresses are at least recorded as address data constituted by N bits, wherein one of the (+) side address data and the (−) side address data are recorded in the form of the N bit data of which upper $\underline{n}$ bits, where $N > n$, are all set to one of the binary states, with the remaining bits of said N bits representing the addresses, and wherein the other of said (+) side address data and said (−) side address data are recorded as data by said N bits exclusive of those data in which the upper $\underline{n}$ bits are in said one of said binary states.

In accordance with the present invention, there is also provided an address discriminating circuit for a recording medium in the form of a disc in which locations on the disc other than a predetermined location as set as a zero-address are represented by (+) side addresses and (−) side addresses with respect to the zero address, and in which the information concerning these addresses are at least recorded as address data constituted by N bits, one of the (+) side address data and the (−) side address data being recorded in the form of the N bit data of which upper $\underline{n}$ bits, where $N > n$, are all set to one of the binary states, with the remaining bits of the N bits representing the addresses, the other of the (+) side address data and the (−) side address data are recorded as data by the N bits exclusive of those data in which the upper $\underline{n}$ bits are in the aforementioned one of the binary states, wherein the address discriminating circuit comprises binary state discriminating means for discriminating the binary states of the upper $\underline{n}$ bits of the N bit address data read from the recording medium, and discriminating means for deciding the address data to be address data on said the aforementioned one of the (+) side address data and the (−) side address data if the binary state of all of the upper $\underline{n}$ bits as found by the binary state discriminating means is the aforementioned one of the binary states, and discriminating the addresses based on remaining data of the N bits, with the discriminating means deciding the address data to be the other of the (+) side address data and said (−) side address data if the binary state of the upper $\underline{n}$ bits as found by the binary state discriminating means is such state excluding data states in which the $\underline{n}$ bits are all in the aforementioned one of the binary states, and discriminating the addresses based on the N-bit data exclusive of such N-bit data in which the upper $\underline{n}$ bits of the N bits are all in the above-mentioned one of the binary states.

That is, with the above described disc-shaped recording medium, the polarity or sign of the track addresses, pre-recorded as embossed bits on the disc, is represented by using particular upper order bits (upper $\underline{n}$ bits) in the manner of sign bits, without using the most significant bit (MSB) as a sign bit, as in customary 2's complement representation. Besides, as means for discriminating the polarity or sign of the track addresses in the above-mentioned address discriminating circuit, the polarity or sign is discriminated by ANDing the upper $\underline{n}$ bits.

The disc-shaped recording medium and the address discriminating circuit, according to the present invention, are so arranged and constructed that, by taking advantage of the fact that the number of addresses required for one of the (+) side and the (−) side according to the conventional format, such as the (−) side, is less than that required for the other side, for example, the (+) side, the upper $\underline{n}$ bits of the N bits are used in the manner of sign bits for representing the addresses for the above-mentioned one side for indicating that the address is for the one side, and for representing the address by the remaining bits, while the addresses For the other side are represented by the N bits inclusive of the upper $\underline{n}$ bits, with the upper $\underline{n}$ bits not being all in the aforementioned one of the binary states indicating that the addresses are those for the above-mentioned other side. The above-described arrangement renders it possible to cope with an increased number of track addresses on the other side of the disc.

Other objects and advantages of the present invention will become more apparent from the following description of the preferred embodiment and the claims.

DETAILED DESCRIPTION OF THE PREFERRED EMBODIMENTS

The disc-shaped recording medium according to the present invention is such a disc in which, as shown in FIG. 1, a predetermined position on the disc D, such as a track at a radius of 30 mm, is a zero-address track, with the remaining positions on the disc D being represented by addresses on the plus (+) side and those on the minus(−) side, with respect to the zero address, and with data of the addresses being at least recorded as address data constituted by N bits, such as by 16 bits. Address data of one of the (+) or radially outer region and the (−) or radially inner region of the disc, for example, address data of the radially inner region of the disc, are recorded in the form of N-bit data in which upper order $\underline{n}$ bits of the N bits, where N > n, for example, N=16 and n=4, are all set to one of the states of the binary number system such as all "1" and in which the addresses are indicated by the remaining bits of the N (=16) bits. On the other hand, address data of the remaining region, herein the radially outer region of the disc, are recorded in the form of 16 bit data exclusive of those data in which the upper order four bits of the 16 bits are all in the above-mentioned one state of the binary number system, herein all "1", in other words, are recorded in the form of the 16 bit data in which at least one "0" is present in the upper order four bits.

Figure 2:
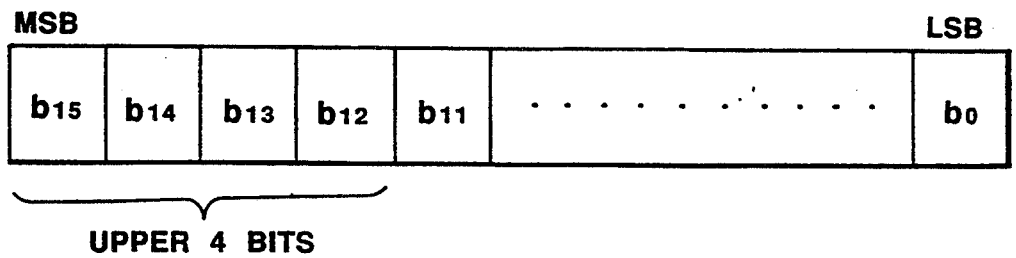
FIG. 2 shows 16-bit address data employed in the present invention.

That is, for indicating the addresses of the radially inner region, that is the (−) region, the upper four bits $b_{15}$, $b_{14}$, $b_{13}$ and $b_{12}$ of the 16 bits $b_{15}$, $b_{14}$, ''' $b_0$ of the address data are all set to, for example, "1", with the remaining bits $b_{11}$, ''' $b_0$ indicating the addresses, whereas, for indicating the addresses of the radially outer region, that is the (+) region, the addresses are indicated by the 16 bits $b_{15}$, $b_{14}$, ''' $b_0$, exclusive of those 16 bit data in which the upper four bits $b_{15}$, $b_{14}$, $b_{13}$ and $b_{12}$ are all "1", as shown in FIG. 2. It is such address data that are recorded in an inner extension region $AR_{IN}$ of the disc D, as hereinafter explained.

In the embodiment illustrated, by utilizing the upper four bits of the 16 bits in the manner of sign bits, up to the −4096th address may be represented for the (−) or radially inner region, whereas up to the +whereas up to the +61439th address may be represented for the (+) or radially outer region, in other words, it becomes possible to represent the number of tracks such that −4096 < number of tracks ≦ +61439.

In this manner when the track pitch is set to 1.4 μm all of the track numbers may be indicated while interchangeability with the above-mentioned conventional format is maintained. It should be noticed that the tracks for the (−) region or the radially inner region of the disc are test tracks or control data tracks etc, as stated hereinbefore, and it suffices to represent about 1000 or fewer tracks, specifically, 400 to 800 tracks, so that the track pitch may be set to 1.4 μm without raising any particular problems.

Although the upper $\underline{n}$ bits are four bits in the above embodiment, these $\underline{n}$ bits may also be two or three bits. If the upper $\underline{n}$ (=2) bits are used in the manner of the sign bits, it becomes possible to indicate the track number such that −16384 < number of tracks < +49151. If the upper $\underline{n}$ (=3) bits are used in the manner of the sign bits, it becomes possible to represent the track number within a range of −8192 < number of tracks < +57343. For reference sake, with the conventional 2's representation, in which the upper one bit is used as the sign bit, the track number that may be represented is such that −32768 < number of tracks < +32767, such that the number of tracks for the (+) region cannot be represented for the above format.

Figure 1A:
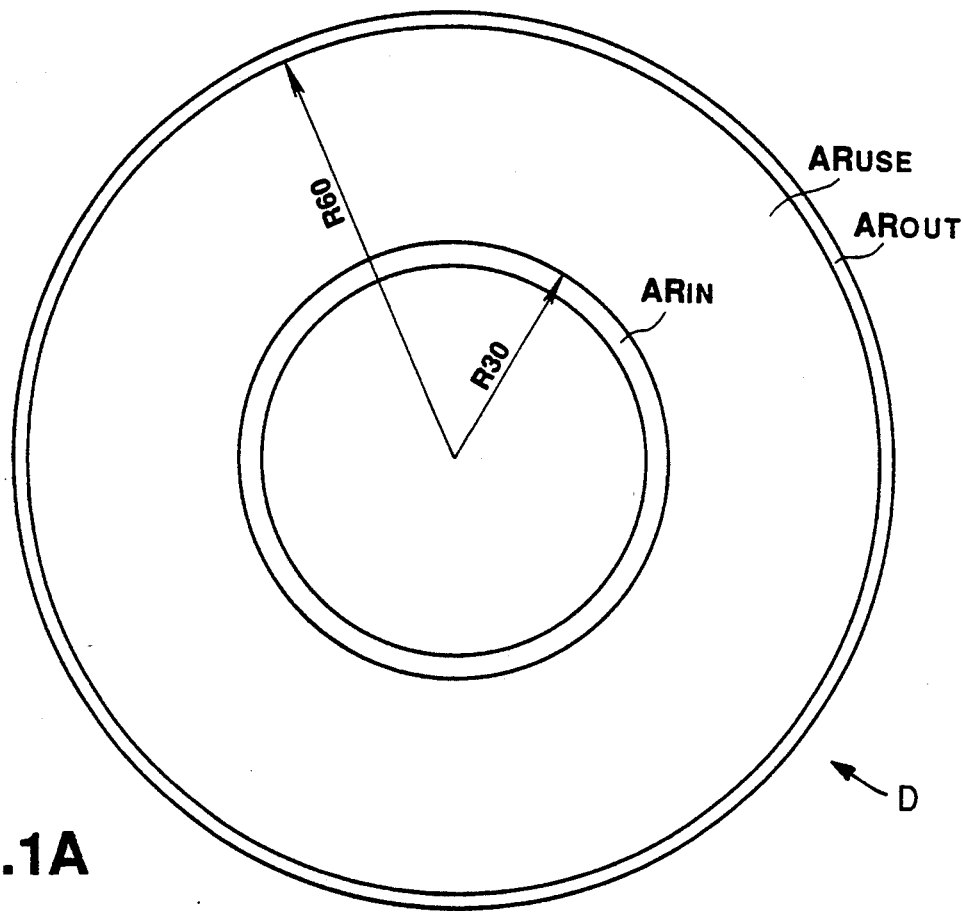
FIGS. 1a and 1b show a disc shaped recording medium embodying the present invention, and various regions thereof.

The format for the disc D shown in FIG. 1A is explained.

The disc D has a format according to ISO/IEC 10089:1991 (E) and has a spirally extending track. The radially inner expansion region $AR_{IN}$ is formed in a region from radius 27 mm to radius 30 mm, a user area (user recordable area) $AR_{USE}$ is formed in a region from radius 30 mm to radius 60 mm, and a radially outer extension region $AR_{OUT}$ is formed in a region from radius 60 mm to radius 61 mm, from the center of the disc D, as shown in FIG. 1.

Figure 1B:
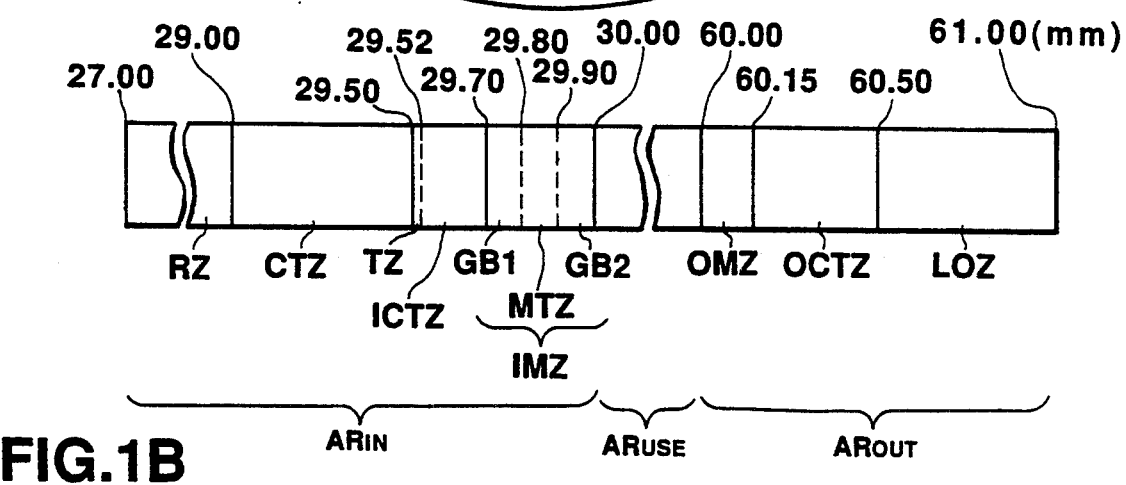

As to the inner extension area $AR_{IN}$, a reflective mirror area RZ is formed in an area from radius 27.00 mm to radius 29.00 mm, and a PEP control track area CTZ is formed in the adjacent area from radius 29.00 mm to radius 29.50 ram, as shown in FIG. 1B. The PEP data are rotation control data, of data for modulation system, disc type etc. of the optical disc, recorded by embossed bits. A transition area TZ is formed in a zone of from radius 29.50 mm to radius 29.52 mm radially outwardly of the PEP control track area CTZ, and a radially inner SFP control track area CTZ, bearing SFP data, is formed in an adjacent zone of from radius 29.52 mm to radius 29.70 mm.

The SFP data are system data including PEP data and representing optical disc medium data, power or pulse width etc. of the recording/reproducing laser power, and is recorded in the form of embossing pits.

An area of radius 29.70 mm to radius 30.00 ram, radially outside the radially inner SFP control track area ICTZ, is defined as a radially inner area for producer use IMZ, whereas an area of radius 29.80 mm to radius 29.90 mm, sandwiched between a first guard band GB1 of radius 29.70 mm to radius 29.80 mm and a second guard band GB2 of radius 29.80 mm to 29.90 mm, is used as a producer test area MTZ.

As for the radially outer extension area $AR_{OUT}$, an area of from radius 60.00 mm to radius 60.15 mm is defined as a radially outer area for producer use OMZ, a radially outer SFP control track area OCTZ is formed in an adjacent area of from radius 60.15 mm to radius 61.50 ram, and an adjacent area of from radius 60.50 mm to radius 61.00 mm is used as a leadout area LOZ.

Meanwhile, a value indicating the write-once type optical disc, such as "00010000" or a value indicating an overwrite type magneto-optical disc, such as "00100000", is usually set as disc type indicating one-byte data of PEP data of the PEP control track data CTZ.

A recording track with a track pitch of, for example, 1.4 $\mu$m, formed in the user recordable area $AR_{USE}$ between radius 30 mm and radius 60 mm.

Figure 3:
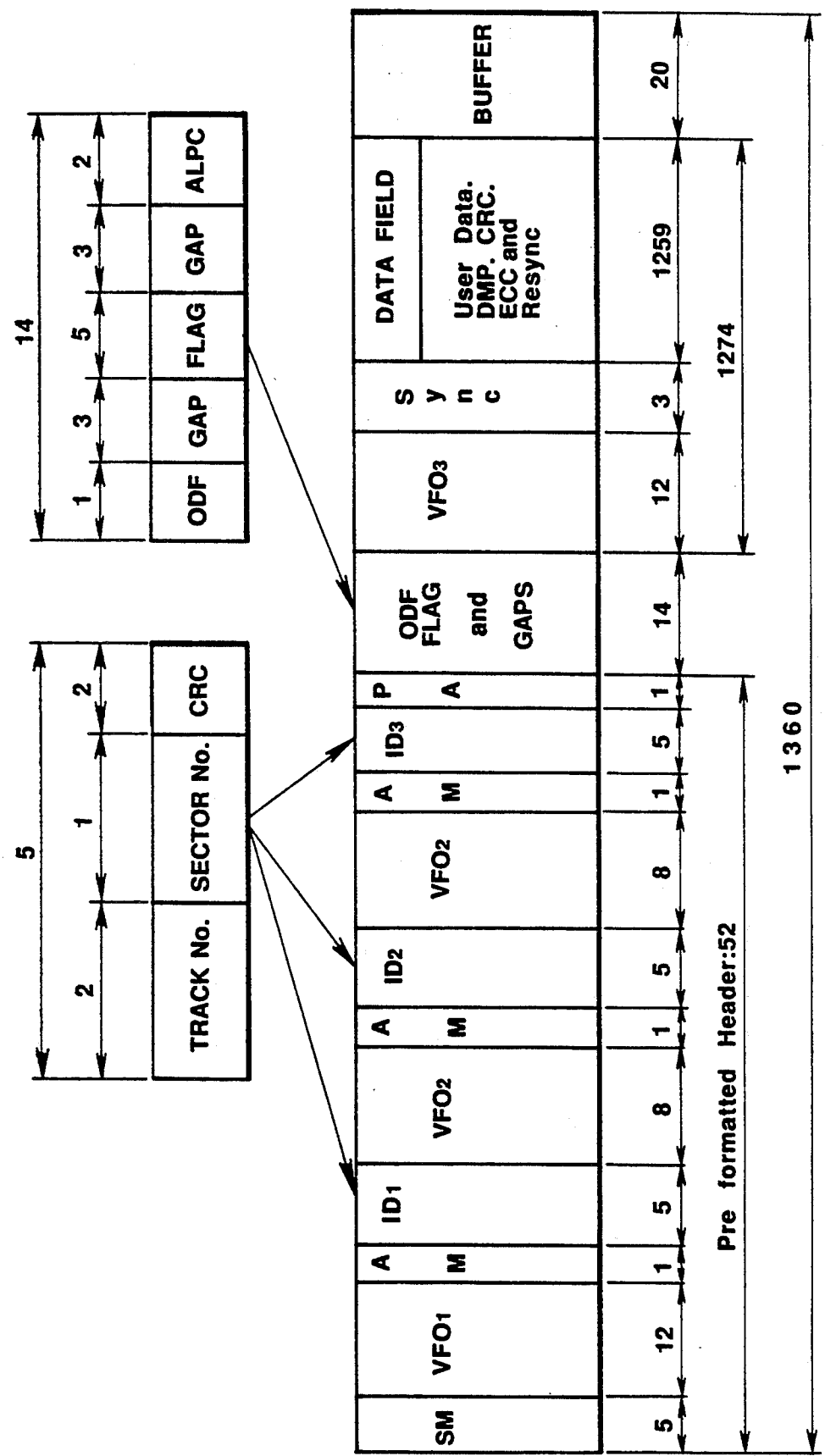
FIG. 3 shows a sector format employed in the present invention.

FIG. 3 shows a sector Format of the above-mentioned disc D. The sector consists of 1360 bytes and is made up of a 5-byte sector mark SM, 12-byte $VFO_1$ and $VFO_3$, two 8-byte $VFO_2$, three 1-byte address mark AM, $ID_1$ to $ID_3$, each having, 8bytes, a 1-byte postamble PA, ODF, flags and gaps, each being of 14 bytes, a 3-byte sync, a 1259 byte data field, and a 20-byte buffer. The $ID_1$ to $ID_3$ each consist in 2-byte track number a 1-byte sector number and a 2-byte CRC. The ODF, flags and gaps consist of 1-byte ODF, two 3-byte gaps, a 5-byte flag and a 2-byte ALPC.

Figure 4:
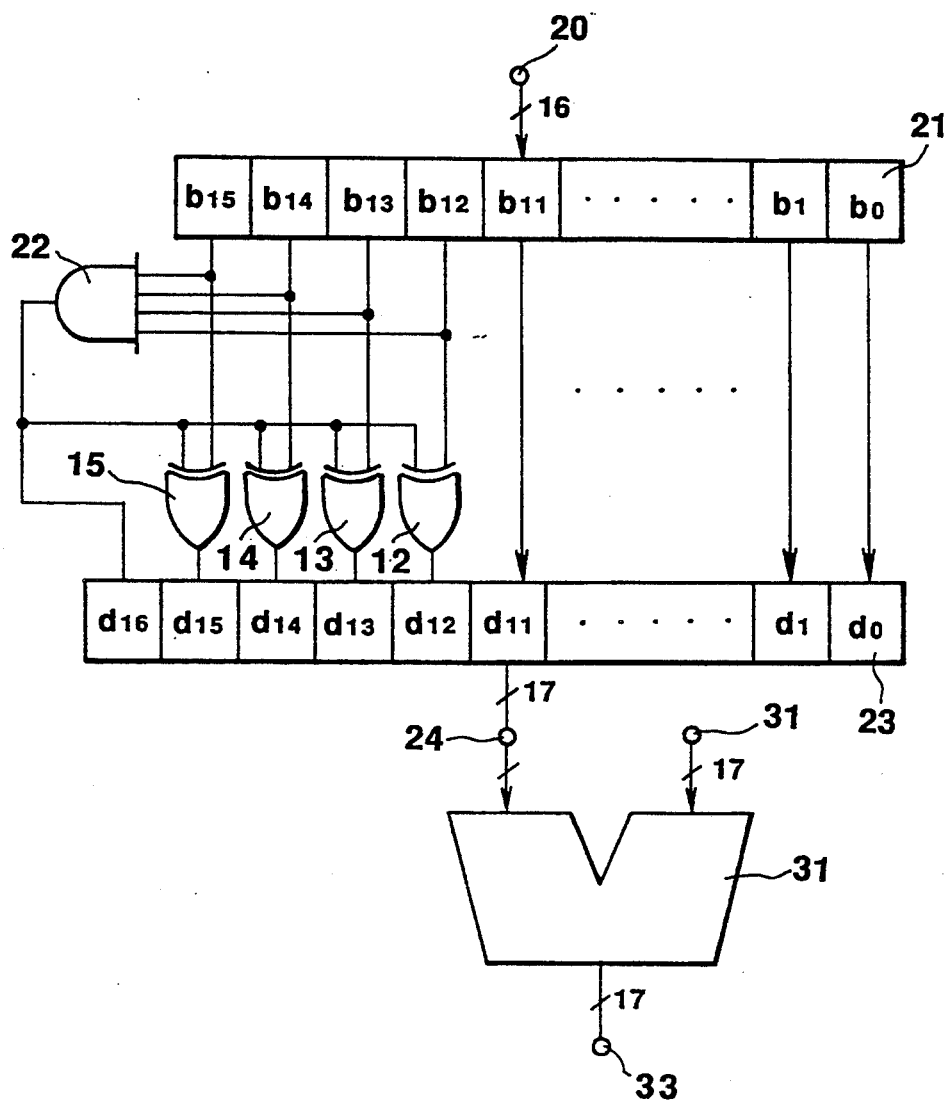
FIG. 4 is a circuit diagram showing a schematic arrangement of an address discriminating circuit for the disc-shaped recording medium embodying the present invention.

The address discrimination circuit For the disc-shaped recording medium according to the present invention is an address discrimination circuit for discriminating addresses on the disc D of the present embodiment, and includes an AND gate (logical product gate) 22 and exclusive OR gates (EX-OR gates) 15, 14, 13 and 12, as shown in FIG. 4. The AND gate 22 acts as state discriminating means for discriminating the states in the binary number of the upper n bits, such as upper four bits, of the N bits, such as 16 bits, of the address data read from disc D. On the other hand, the exclusive OR gates act as discriminating means for deciding that the address data are those for one of the (+) side and the (−) side address data, for example, the (−) side address data when the states of the upper four bits in the binary number as found at the AND gate 22 are the above-mentioned one of the two states such as all "1", and discriminating the addresses based on the remaining 12 bits, while deciding that the address data are those for the other of the (+) side and the (−) side address data, for example, the (+) side address data when the states of the upper four bits in the binary number as found at the AND gate 22 are the states excluding the states in which the upper four bits are all in the above-mentioned one of the states, that is in the states in which at least one "0" is present in the upper four bits, and discriminating the addresses by the 16 bit data excluding those data in which the upper four bits are all in the above-mentioned one of the states, that is in which the upper four bits are all "1".

Referring to FIG. 4, the 16-bit address data, read out from disc D, are supplied to terminal 20. The 16-bit address data are outputted after being once held in the 16-bit register 21.

Of the address data ($b_{15}$, $b_{14}$, ''' $b_0$) outputted at the register 21, data indicating the upper four bits $b_{15}$, $b_{14}$, $b_{13}$ and $b_{12}$ are transmitted to AND gate 22. The AND gate 22 is a four-input AND gate, so that its output becomes "1" and "0" when all of the data supplied to the four input terminals are "1" and when otherwise, respectively. Stated differently, the output of the AND gate 22 becomes "0" when at least one "0" is present in the data supplied to the four input terminals.

On the other hand the upper four bit data $b_{15}$, $b_{14}$, $b_{13}$ and $b_{12}$. of the data supplied from register 21 are transmitted to one of the four input terminals of the associated exclusive OR gates 15, 14, 13 and 12, the other inputs of which are supplied with the output of the AND gate 22.

Therefore, if the upper four bit data $b_{15}$, $b_{14}$, $b_{13}$ and $b_{12}$ are all "1", output data $d_{15}$, $d_{14}$, $d_{13}$ and $d_{12}$ of the exclusive OR gate are "0000". On the other hand, if at least one "0" is present in the data $b_{15}$, $b_{14}$, $b_{13}$ and $b_{12}$ of the upper four bits, for example, if the data of the upper four bits $b_{15}$, $b_{14}$, $b_{13}$ and $b_{12}$ are "1011", the output data $d_{15}$, $d_{14}$, $d_{13}$ and $d_{12}$ of the exclusive OR gate are "1011" and, if the data of the upper four bits $b_{15}$, $b_{14}$, $b_{13}$ and $b_{12}$ are "0000", the output data $d_{15}$, $d_{14}$, $d_{13}$ and $d_{12}$ of the exclusive OR gate are "0000".

That is, when the upper four bit data $b_{15}$, $b_{14}$, $b_{13}$ and $b_{12}$ are all "1",. output data $d_{15}$, $d_{14}$, $d_{13}$ and $d_{12}$ of the exclusive OR gate 15, 14, 13 and 12 are complemented and become "0000". Conversely, if at least one "0" is present in the upper four bit data $b_{15}$, $b_{14}$, $b_{13}$ and $b_{12}$, the upper four bit data $b_{15}$, $b_{14}$, $b_{13}$ and $b_{12}$ are directly outputted as the output data $d_{15}$, $d_{14}$, $d_{13}$ and $d_{12}$ of the exclusive OR gate 15, 14, 13 and 12.

In this manner, if the upper four bit data $b_{15}$, $b_{14}$, $b_{13}$ and $b_{12}$ are all "1 the upper four bits of the 16-bit data outputted from register 21 are "0", so that the binary number is represented by the 16 bits less the upper four bits, or by the lower 12 bits. Conversely, if at least one "0" is present in the upper four bits $b_{15}$, $b_{14}$, $b_{13}$, and $b_{12}$, the binary number is represented by the 16-bit data outputted from register 21, that is by the 16 bit data excluding those 16 bit data in which the upper four bits are all "1".

Outputs of the exclusive OR gates 15, 14, 13 and 12 and data of the lower 12 bit data $b_{11}$, ''' $b_0$ are transmitted to a storage area of a 17-bit register 23 exclusive of a most significant bit (MSB). An output of AND gate 22 is supplied to a storage location corresponding to the MSB of the 17-bit register 23.

In the embodiment illustrated, the output of the AND gate 22 supplied to the storage location corresponding to the MSB of the register 23 is used as a sign bit in 2's complement representation. That is the address is negative (−) and positive (+) when the MSB is "1" and "0", respectively.

The 17-bit data stored in register 23 are output as address data from output terminal 24 of the address discrimination circuit of the present embodiment.

With the address discrimination circuit of the present embodiment, if the above-mentioned 16-bit address data supplied to the terminal 20 are "1111000011111111", for example, output data from output terminal 24 are "10000000011111111", so that the address represented by the output data becomes −3841. On the other hand, if the above-mentioned 16-bit address data supplied to the terminal 20 are "1011000000000010", for example, output data from output terminal 24 are "01011000000000010", so that the address represented by the output data becomes +45062.

With the above-described address discriminating circuit, which the upper four bits of the 16-bit address data, read out from disc D, and having the same format as the conventional format, are used in the manner of sign bits, it becomes possible to discriminate addresses up to the −4096th address and up to the (+)61439th address on the radially inner side or (−) side and on the radially outer side or (+) side, respectively, so that the range of addresses that can be discriminated is from the −4096th to the +61439th address.

Besides, with the embodiment illustrated, the number of tracks not less than 32678 may be represented by 2-byte track addresses according to the conventional format, so that interchangeability with the current format may be realized with the 2-byte track addresses. Besides, address discrimination may be achieved by simplified circuitry.

If address data should be summed using outputs of the address discrimination circuit shown in FIG. 4, address data from output terminal 24 of the above-described address discrimination circuit are added by an addition circuit 33 to data from a terminal 31 which is supplied with 17-bit address data from another address discriminating circuit similar to terminal 24. The results of addition are supplied via terminal 33 to a downstream side circuit, not shown.

Figure 5:
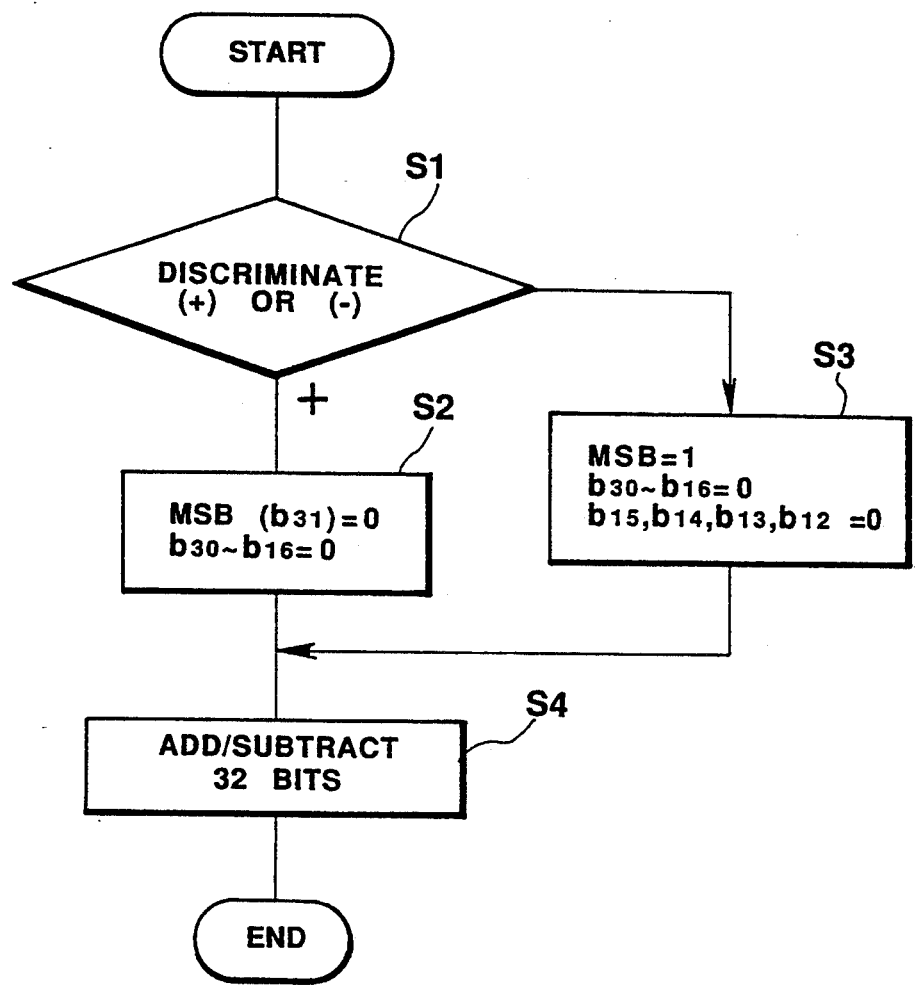
FIG. 5 is a flow chart for illustrating sign discrimination and data summation according to the present invention.

Although FIG. 4 shows a schematic arrangement of the address discriminating circuit of the present embodiment and the manner of output addition, address discrimination and addition (or subtraction) of address data are achieved in effect by a software technique, as indicated by a flow chart shown in FIG. 5. That is, with the flow chart of FIG. 5, address discrimination and addition or substraction of address data are achieved with so-called double-precision processing operation.

At step S1, it is first checked if the address data are positive (+) or negative (−). If the address data are determined to be positive at step S1, control proceeds to step S2. The number of bits is doubled at step S2, that is, the 16-bit address data are converted at step S2 to 32-bit data, at the same time that the MSB (bit $b_{31}$) of the 32 bit data is set to "0" and the bits $b_{30}$ to bit $b_{16}$ are also set to "0", before control proceeds to step S4. The 32-bit data produced at step S2 are algebraically summed to another 32 bit data in an additive or subtractive mode.

If the address data are found at step S1 to be negative, control proceeds to step S3, where the 16-bit data are similarly converted into 32-bit data, the MSB (bit $b_{31}$) is set to "1", bits $b_{30}$ to bit $b_{16}$ are set to "0" and bits $b_{15}$, $b_{14}$, $b_{13}$ and $b_{12}$ are also set to "0", before control passes to step S4. The 32-bit data obtained at step S3 are algebraically summed at step S4 to another 32-bit data in an additive or subtractive mode.

Figure 6:
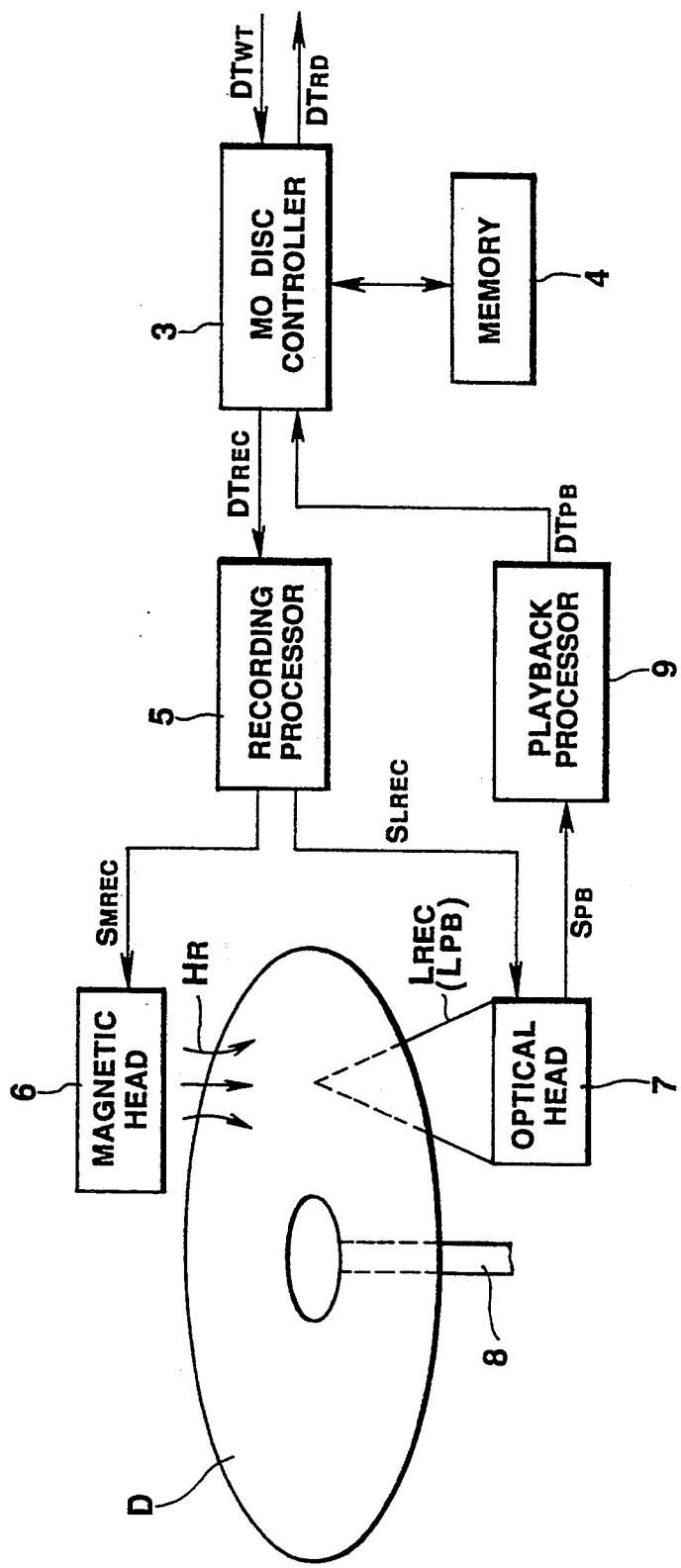
FIG. 6 is a block circuit diagram showing the schematic arrangement of the disc-shaped recording medium and a recording and/or reproducing apparatus employing the disc-shaped recording medium.

The address discriminating circuit of the present embodiment may be applied to, for example, a playback circuit 9 or a magneto-optical disc controlling circuit 3 of a disc recording and/or reproducing apparatus shown in FIG. 6.

The arrangement shown in FIG. 6 renders it possible to record and/or reproduce signals using the disc D of the present embodiment which, as an example, is a magneto-optical disc. That is, information data corresponding to write data $DT_{WT}$ entered from a host computer, not shown, along with write commands are written on the disc D, while information data read out from disc D responsive to read-out commands entered from host computer are transmitted as read-out data $DT_{RD}$ to host computer.

That is, when information data are to be written on the disc D, the write command and the data to be written are first written in a memory circuit 4 via a magneto-optical disc controlling circuit 3 arranged in a microcomputer configuration.

The magneto-optical disc controlling circuit 3 converts the write data $DT_{WT}$, written in memory circuit 4, into block data at an interval of the above-mentioned sector as a recording unit, while appending predetermined additional information to the block data. The resulting data are read out as recording information data $DT_{REC}$ which are transmitted to a recording processing circuit 5.

The recording processing circuit 5 modulates the input recording information data $DT_{REC}$ to generate magnetic recording driving signals $S_{MREC}$ and optical recording driving signals $S_{LREC}$ which are transmitted to a magnetic head 6 and to an optical head 7, respectively.

This causes the magnetic head 6 to apply a recording magnetic field $H_R$, corresponding to the magnetic recording driving signal $S_{MREC}$, on the front side of the disc D, run into rotation about shaft 8 as a center of rotation, while causing the optical head 7 to radiate the recording laser light $L_{REC}$ corresponding to the optical recording driving signal $S_{LREC}$ from the back side of the disc D, for writing the information data corresponding to the write data $DT_{WT}$ on the disc D.

When the information data are to be read from disc D, a readout command is entered into the magneto-optical disc controlling circuit 3 which causes the optical head 7 to emit the light to radiate a playback light $L_{PB}$ at an arbitrary position on the disc D responsive to the readout command.

As a result thereof, the optical head 7 receives the light reflected from disc D to transmit the resulting playback signals $S_{PB}$ to playback processing circuit 9.

The playback processing circuit 9 converts the playback signals into corresponding two-valued signals to demodulate the two-valued signals to generate playback information data $DT_{PB}$ which are transmitted to the magneto-optical disc controlling circuit 3 so as to be written in memory circuit 4. The magneto-optical disc controlling circuit 3 performs error detection and correction and de-blocking on the playback information data $DT_{PB}$ thus written in memory circuit 4 and reads out the error-corrected and de-blocked data as playback data $DT_{RD}$ which are supplied to the host computer.

In this manner, the information data may be read out from disc D responsive to the readout command.

The disc-shaped recording medium and the address discriminating circuit, according to the present invention, are so arranged and constructed that, by taking advantage of the fact that the number of addresses required for one of the (+) side and the (−) side according to the conventional format, such as the (−) side, is lesser than that required for the other side, for example, the (+) side, the upper n bits of the N bits are used in the manner of sign bits for representing the addresses for the above-mentioned one side for indicating that the address is for the one side, and for representing the address by the remaining bits, while the addresses for the other side are represented by the N bits inclusive of the upper n bits with the upper n bits not being in the state of indicating the above-mentioned one side showing that the addresses are those for the above-mentioned other side. Since the arrangement renders it possible to cope with the increased number of addresses required for the other side, it becomes possible to represent the tracks in their entirety, while maintaining interchangeability with the conventional system, even although the track pitch of the disc-shaped recording medium is increased as compared with the conventional system, thereby rendering it possible to discriminate easily the track addresses of the disc-shaped recording medium.

What is claimed is:

1. A recording medium in the form of a disc in which locations on said disc other than a predetermined location set as a zero-address are represented by (+) side addresses and (−) side addresses with respect to said zero address, and in which the information concerning these addresses are at least recorded as address data constituted by N bits, wherein one of either said (+) side address data and said (−) side address data are recorded in the form of said N bit data of which the upper n bits, where N>n and n is at least 2, are all set to one of the binary states, with the remaining bits of said N bits representing the addresses, and wherein the other of said (+) side address data and said (−) side address data are recorded as data by said N bits exclusive of those data in which the upper n bits are in said one of said binary states.

2. The recording medium as defined in claim 1 wherein said (+) side and said (−) side are the radially outer and radially inner sides with respect to said predetermined location on said disc, said N bits are 16 bits, said upper n bits are 4 bits, address data on said radially inner side are recorded as data in which the upper four bits are all set to the binary "1", with the remaining lower 12 bits representing the addresses, and wherein address data on said radially outer side are recorded as data by said 16 bits exclusive of those data in which the upper four bits are in the state of binary "1".

3. An address discriminating circuit for a recording medium in the form of a disc in which locations on said disc other than a predetermined location set as a zero-address are represented by (+) side addresses and (−) side addresses with respect to said zero address, and in which the information concerning these addresses are at least recorded as address data constituted by N bits, one of said (+) side address data and said (−) side address data being recorded in the form of said N bit data of which upper n bits, where N>n and n is at least 2, are all set to one of the binary states, with the remaining bits of said N bits representing the addresses, the other of said (+) side address data and said (−) side address data are recorded as data by said N bits exclusive of those data in which the upper nbits are in said one of said binary states, said address discriminating circuit comprising binary state discriminating means for discriminating the binary states of said upper n bits of said N bit address data read from said recording medium, and discriminating means for deciding the address data to be one of said (+) side address data and said (−) side address data if the binary state of all of said upper n bits as found by said binary state discriminating means is said one of the binary states, and discriminating the addresses based on remaining data of the N bits, said discriminating means deciding the address data to be the other of said (+) side address data and said (−) side address data if the binary state of the upper n bits as found by said binary state discriminating means is such binary state excluding data the states in which the n bits are all in said one of the binary states, and discriminating the addresses based on said N-bit data exclusive of such N-bit data in which the upper n bits of said N bits are all in the above-mentioned one of the binary states.

4. An address discriminating circuit for a recording medium in the form of a disc in which said (+) side and said (−) side are the radially outer and radially inner sides with respect to said predetermined location on said disc, said N bits are 16 bits, said upper n bits are 4 bits, address data on said radially inner side are recorded as data in which the upper four bits are all set to the binary "1", with the remaining lower 12 bits representing the addresses, and wherein address data on said radially outer side are recorded as data by said 16 bits exclusive of those data in which the upper four bits are in the state of binary "1", as defined in claim 2, wherein the improvement resides in that said binary state discriminating means discriminating the binary states of the upper four bits of said 16-bit address data read out from said recording medium, and in that said discriminating means deciding the address data to be address data on said one of said (+) side address data and said (−) side address data if the binary state of all of said upper four bits as found by said binary state discriminating means is said one of the binary states, and discriminating the addresses based on remaining data of the 16 bit data, said discriminating means deciding the address data to be address data in said other of said (+) side address data and said (−) side address data the binary state of the upper four bits as found by said binary state discriminating means is such state excluding data states in which the four bits are all in said one of the binary states, and discriminating the addresses based on said 16-bit data exclusive of such 16 bit data in which the upper four bits of said 16 bits are all in the above-mentioned one of the binary states.

5. An address discriminating circuit for a recording medium in the form of a disc in which locations on said disc other than a predetermined location set as a zero-address are represented by (+) side addresses and (−) side addresses with respect to said zero address, and in which the information concerning these addresses are at least recorded as address data constituted by N bits, one of said (+) side address data and said (−) side address data being recorded in the form of said N bit data of which upper n bits, where N>n and n is at least 2, are all set to one of the binary states, with the remaining bits of said N bits representing the addresses, the other of said (+) side address data and said (−) side address data are recorded as data by said N bits exclusive of those data in which the upper n bits are in said one of said binary states, said address discriminating circuit comprising:

an AND gate having a plurality of inputs, the inputs coupled for sensing from a first register the binary state of said upper n bits, and AND gate further having an output coupled to a second register to store the binary state of said output as a most significant bit; and the plurality of exclusive OR gates, each exclusive OR gate having at least two inputs, a first input of each exclusive OR gate connected in common and coupled to the output of the AND gate, as second input of each exclusive OR gate coupled to one input of the AND gate, each exclusive OR gate having an output coupled to store the binary state of such output as successive next most significant bits within the second register.

* * * * *